(12) United States Patent
Song et al.

(10) Patent No.: US 12,546,403 B2
(45) Date of Patent: Feb. 10, 2026

(54) FLOW PATH SWITCHING DEVICE

(71) Applicant: LG ELECTRONICS INC., Seoul (KR)

(72) Inventors: Sungbae Song, Seoul (KR); Junho Min, Seoul (KR); Moonkee Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 328 days.

(21) Appl. No.: 18/028,871

(22) PCT Filed: Sep. 28, 2021

(86) PCT No.: PCT/KR2021/013258
§ 371 (c)(1),
(2) Date: Mar. 28, 2023

(87) PCT Pub. No.: WO2022/071725
PCT Pub. Date: Apr. 7, 2022

(65) Prior Publication Data
US 2023/0332698 A1  Oct. 19, 2023

(30) Foreign Application Priority Data
Sep. 29, 2020  (KR) .......................... 10-2020-012767

(51) Int. Cl.
*F16K 11/085* (2006.01)
*F16K 27/06* (2006.01)
(Continued)

(52) U.S. Cl.
CPC ........ *F16K 11/0856* (2013.01); *F16K 27/065* (2013.01); *F25B 41/20* (2021.01); *F16K 31/041* (2013.01); *F25B 2600/2507* (2013.01)

(58) Field of Classification Search
CPC .. F16K 11/0856; F16K 27/065; F16K 11/076; F16K 31/041; F16K 31/055;
(Continued)

(56) References Cited

U.S. PATENT DOCUMENTS 3,021,869 A * 2/1962 Ross ....................... F15B 13/04
137/625.24
4,602,657 A * 7/1986 Anderson, Jr. ..... G01L 19/0015
73/1.61
(Continued)

FOREIGN PATENT DOCUMENTS

CN 2184171 11/1994
CN 101040120 9/2007
(Continued)

OTHER PUBLICATIONS

Extended European Search Report dated Oct. 4, 2024, issued in Application No. 21876000.7.
(Continued)

*Primary Examiner* — Craig J Price
(74) *Attorney, Agent, or Firm* — KED & ASSOCIATES

(57) ABSTRACT

A flow path switching device includes a case including a first nozzle, a second nozzle, a plurality of inner outflow pipes, a plurality of inner inflow pipes, and a flow path connection portion in which a space is formed to connect the plurality of inner outflow pipes with the first nozzle or to connect the plurality of inner inflow pipes with the second nozzle; a valve which is rotatably disposed in the space; and a motor which is disposed in one side of the valve, and rotates the valve. The plurality of inner outflow pipes is disposed in an opposite direction to the plurality of inner inflow pipes based on a rotary shaft of the valve.

13 Claims, 9 Drawing Sheets

(51) Int. Cl.
*F16K 31/04* (2006.01)
*F25B 41/20* (2021.01)

(58) Field of Classification Search
CPC .. F16K 11/00; F25B 41/20; F25B 2600/2507; F25B 13/00; F25B 25/005; F24F 1/26; Y10T 137/86871
USPC ............ 137/625.46, 625.41, 625.47, 625.31, 137/625.32, 625.23, 625.42, 597
See application file for complete search history.

(56) References Cited

U.S. PATENT DOCUMENTS

| | | | |
|---|---|---|---|
| 6,994,316 B2* | 2/2006 | Pervaiz | F16K 11/085 |
| | | | 251/175 |
| 9,234,684 B2* | 1/2016 | Kojima | F25B 41/20 |
| 10,215,452 B2* | 2/2019 | Ogawa | F16K 11/076 |
| 10,330,208 B2* | 6/2019 | Takamatsu | F16K 27/06 |
| 10,337,626 B2* | 7/2019 | Takamatsu | F16K 11/076 |
| 10,543,148 B1 | 1/2020 | Collins et al. | |
| 12,331,838 B2* | 6/2025 | Min | F16K 11/0856 |
| 2016/0003490 A1* | 1/2016 | Motomura | F25B 13/00 |
| | | | 62/196.1 |
| 2016/0245539 A1* | 8/2016 | Motomura | F24F 11/84 |
| 2017/0191574 A1* | 7/2017 | Takamatsu | F16K 11/076 |
| 2017/0191706 A1 | 7/2017 | Ogawa et al. | |
| 2024/0175502 A1* | 5/2024 | Min | F16K 11/0856 |

FOREIGN PATENT DOCUMENTS

| | | |
|---|---|---|
| EP | 3 611 443 | 2/2020 |
| JP | 09-079396 | 3/1997 |
| JP | 2011-043188 | 3/2011 |
| JP | 5236009 | 7/2013 |
| JP | 2017-172773 | 9/2017 |
| JP | 6192706 | 9/2017 |
| KR | 10-1987469 | 6/2019 |
| WO | WO 2018/189805 | 10/2018 |

OTHER PUBLICATIONS

International Search Report (with English Translation) issued in Application No. PCT/KR2021/013258 dated Jan. 20, 2022.
Chinese Office Action issued in Application No. 202180065912.5 dated Jul. 4, 2025.

* cited by examiner

FLOW PATH SWITCHING DEVICE

CROSS-REFERENCE TO RELATED PATENT APPLICATIONS

This application is a U.S. National Stage Application under 35 U.S.C. § 371 of PCT Application No. PCT/KR2021/013258, filed Sep. 28, 2021, which claims priority to Korean Patent Application No. 10-2020-0127617, filed Sep. 29, 2020, whose entire disclosures are hereby incorporated by reference.

TECHNICAL FIELD

The present disclosure relates to an air conditioner, and more particularly, to an air conditioner including a flow path switching device.

BACKGROUND ART

An air conditioner is an apparatus for maintaining the air in a certain space in the most suitable condition according to a use and a purpose. The air conditioner includes a compressor, a condenser, an expansion device, and an evaporator, and a refrigeration cycle that performs compression, condensation, expansion, and evaporation of refrigerant is driven to cool or heat the certain space.

In recent years, the type of refrigerant used in air conditioners and the amount of refrigerant charge are restricted according to environmental regulation policies. In addition, in order to secure safety from refrigerant leakage, etc., there is a movement to restrict a refrigerant line circulated in an air conditioner from installing in an indoor space.

Accordingly, a technique for controlling the temperature of an indoor space by adding a line using water to reduce the amount of refrigerant used in the air conditioner and to remove the refrigerant line to the indoor space has been proposed.

Prior Art JP 5236009 discloses an air conditioner capable of adjusting the temperature of an indoor space by exchanging heat between a refrigerant and water and supplying the heat-exchanged water to a plurality of indoor units.

Here, a valve may be provided to send water that exchanged heat with the refrigerant to each of the plurality of indoor units.

JP 6192706 discloses a flow path switching device for individually supplying water that flows after being cooled or heated through two heat exchangers to each of a plurality of indoor units.

However, in the flow path switching device disclosed in the above document, the length of the valve disposed inside is formed long. In addition, in the flow path switching device, inside the valve, a nozzle into which water supplied from the indoor unit is flowed and a water pipe flowing to the heat exchanger are disposed apart from each other. In such a structure, since the flow range of the fluid flowing into the valve is increased, there is a problem in that the amount of fluid flowing through a fluid pipe is increased.

DISCLOSURE

Technical Problem

An object of the present disclosure is to provide a flow path switching device that minimizes the amount of fluid flowing through a water pipe by minimizing a space in which the fluid flows in a valve. That is, it is to prevent heat from being lost or emitted in a process of fluid movement, by minimizing an area where the fluid flows among an area excluding a heat exchanger.

Another object of the present disclosure is to provide a flow path switching device having a compact structure by densely disposing a plurality of inner outflow pipes, a plurality of inner inflow pipes, and a plurality of nozzles that form an outer shape of the flow path switching device.

The objects of the present disclosure are not limited to the object mentioned above, and other objects not mentioned will be clearly understood by those skilled in the art from the following description.

Technical Solution

A flow path switching device of the present disclosure is a device for supplying a fluid heat-exchanged with a heat exchanger disposed in a relay device to an indoor unit. The temperature of an indoor space can be adjusted by selectively supplying each fluid that heat-exchanged with a plurality of heat exchangers to the indoor unit.

A flow path switching device according to an embodiment of the present disclosure includes a plurality of nozzles, a plurality of inner outflow pipes, a plurality of inner inflow pipes that are connected to each of a plurality of nozzles, a case including a flow path connection portion in which a valve is rotatably disposed, a valve rotatably disposed inside the flow path connection portion, and a motor that rotates the valve.

In order to achieve the object, in the flow path switching device, the plurality of inner outflow pipes are disposed in an opposite direction to the plurality of inner inflow pipes based on a rotation shaft of the valve, so that a plurality of inner outflow pipes, a plurality of inner inflow pipes, and a plurality of nozzles that form an outer shape of the case may be densely disposed.

In addition, the first nozzle is disposed between the plurality of inner outflow pipes, and the second nozzle is disposed between the plurality of inner inflow pipes, so that a plurality of inner outflow pipes, a plurality of inner inflow pipes, and a plurality of nozzles that form an outer shape of the case may be densely disposed.

The first nozzle and the second nozzle are disposed perpendicular to the rotation shaft of the valve, and extended in opposite directions to each other, so that a space between a plurality of inner inflow pipes and a plurality of inner discharge pipes can be utilized.

The plurality of inner outflow pipes and the plurality of inner inflow pipes extend in a direction perpendicular to the first nozzle and the second nozzle, and extend in a direction perpendicular to the rotation shaft of the valve, so that a space between a plurality of inner inflow pipes and a plurality of inner discharge pipes can be utilized.

The valve comprises a guide plate which forms an inclined surface between the first nozzle and the second nozzle, and according to disposition, sends fluid flowing from the first nozzle to one of the plurality of inner outflow pipes, and sends fluid flowing from one of the plurality of inner inflow pipes to the second nozzle, so that the movement path of the fluid inside the valve can be minimized by utilizing the space inside the valve.

The first nozzle extends in a direction perpendicular to a direction in which the plurality of inner outflow pipes extend, and the second nozzle extends in a direction perpendicular to a direction in which the plurality of inner inflow pipes extend.

A first nozzle hole through which the first nozzle communicates with the space is formed in the same direction as a plurality of outflow holes through which each of the plurality of inner outflow pipes communicates with the space, and a second nozzle hole through which the second nozzle communicates with the space is formed in the same direction as a plurality of inflow holes through which each of the plurality of inner inflow pipes communicates with the space, so that the fluid flowing through the first nozzle may be supplied to one of a plurality of inner outflow pipes, and the fluid flowed from the plurality of inner inflow pipes may be supplied to the second nozzle.

The plurality of inner inflow pipes comprise a first inner inflow pipe through which fluid heat-exchanged with refrigerant flows through a first heat exchanger, and a second inner inflow pipe through which fluid heat-exchanged with refrigerant flows through a second heat exchanger, wherein the plurality of inner outflow pipes comprise a first inner outflow pipe for sending fluid to the first heat exchanger and a second inner outflow pipe for sending fluid to the second heat exchanger, wherein the first inner inflow pipe is disposed in an opposite direction to the second inner outflow pipe based on the rotation shaft of the valve, and wherein the second inner inflow pipe is disposed in an opposite direction to the first inner outflow pipe based on the rotation shaft of the valve, thereby allowing fluid to flow through the first nozzle and the second nozzle by minimizing the space inside the valve.

The first nozzle is disposed between the first inner outflow pipe and the second inner outflow pipe, and the second nozzle is disposed between the first inner inflow pipe and the second inner inflow pipe, thereby minimizing the outer shape of the case.

In each of the first inner inflow pipe and the second inner inflow pipe, a first inflow hole and a second inflow hole which communicate with the space of the flow path connection portion and are opened in a direction perpendicular to the rotation shaft of the valve are formed, and in each of the first inner outflow pipe and the second inner outflow pipe, a first outflow hole and a second outflow hole which communicate with the space of the flow path connection portion and are opened in a direction perpendicular to the rotation shaft of the valve are formed.

The first inflow hole and the second outflow hole are disposed to face each other, and the second inflow hole and the first outflow hole are disposed to face each other, thereby allowing the fluid flowing through the indoor unit to flow into or be supplied to the same heat exchanger.

The valve comprises a guide plate which forms an inclined surface between the first nozzle and the second nozzle, wherein when one end of the guide plate is disposed between the first nozzle and the first inner outflow pipe, the other end of the guide plate is disposed between the second nozzle and the first inner inflow pipe, and when one end of the guide plate is disposed between the second nozzle and the second inner inflow pipe, the other end of the guide plate is disposed between the first nozzle and the first inner outflow pipe, so that the flow of the fluid selectively flows with one of the plurality of heat exchangers by the guide plate, and simultaneous flow with the plurality of heat exchangers can be prevented from being formed.

The valve includes: a valve body which forms an outer shape, and forms, therein, a first chamber that connects an inner outflow pipe disposed close to the motor and the first nozzle or connects an inner inflow pipe disposed close to the motor and the second nozzle, and a second chamber that connects an inner outflow pipe disposed far from the motor and the first nozzle or connects an inner inflow pipe disposed far from the motor and the second nozzle; and a guide plate which is disposed inside the valve body, and partitions the first chamber and the second chamber, so that the fluid flowing through the first nozzle may be supplied to one of a plurality of inner outflow pipes, and the fluid flowed from a plurality of inner inflow pipes may be supplied to the second nozzle.

In the valve body, a first chamber hole which connects the inner outflow pipe or the inner inflow pipe that is disposed close to the motor with the first nozzle or the second nozzle, and a second chamber hole which connects the inner outflow pipe or the inner inflow pipe that is disposed far from the motor with the first nozzle or the second nozzle are formed, and the first chamber and the second chamber are disposed in opposite directions, so that the fluid flowing through the first nozzle may be supplied to one of a plurality of inner outflow pipes, and the fluid flowed from the plurality of inner inflow pipes may be supplied to the second nozzle.

The first chamber hole and the second chamber hole are formed to have the same size and open in different directions.

When the first chamber hole faces the first nozzle, the second chamber hole is disposed to face the second nozzle, so that the first chamber and the second chamber can always be connected to different nozzles.

The first chamber hole and the second chamber hole are formed to overlap in a portion where the first nozzle and the second nozzle are disposed, so that the shape of the valve can be minimized.

The guide plate is disposed inside the valve body, and connects one end of the first chamber hole and one end of the second chamber hole, so that the flow of the fluid selectively flows with one of the plurality of heat exchangers by the guide plate, and simultaneous flow with the plurality of heat exchangers can be prevented from being formed.

Details of other embodiments are included in the detailed description and drawings.

Advantageous Effects

According to the flow path switching device of the present disclosure, there are one or more of the following effects.

First, there is an advantage in that the fluid flowing through the first nozzle is supplied to the plurality of inner outflow pipes via the guide plate, thereby minimizing the range in which the fluid flows inside the valve. Accordingly, there is also an advantage of preventing heat loss of the fluid in a range in which heat exchange is not performed.

Second, there is also an advantage in that space can be secured inside a relay device by minimizing an outer shape of the flow path switching device.

The effects of the present disclosure are not limited to the effects mentioned above, and other effects not mentioned can be clearly understood by those skilled in the art from the description of the claims.

DESCRIPTION OF DRAWINGS

FIG. 8A is a view for explaining a first inner outflow pipe and a first inner inflow pipe connected to a first heat exchanger, FIG. 8B is a view for explaining the flow of water through a second inner outflow pipe and a second inner inflow pipe connected to a second heat exchanger, and FIG. 8C is a view of a state in which a valve closes a flow path switching device.

MODE FOR INVENTION

Figure 1:
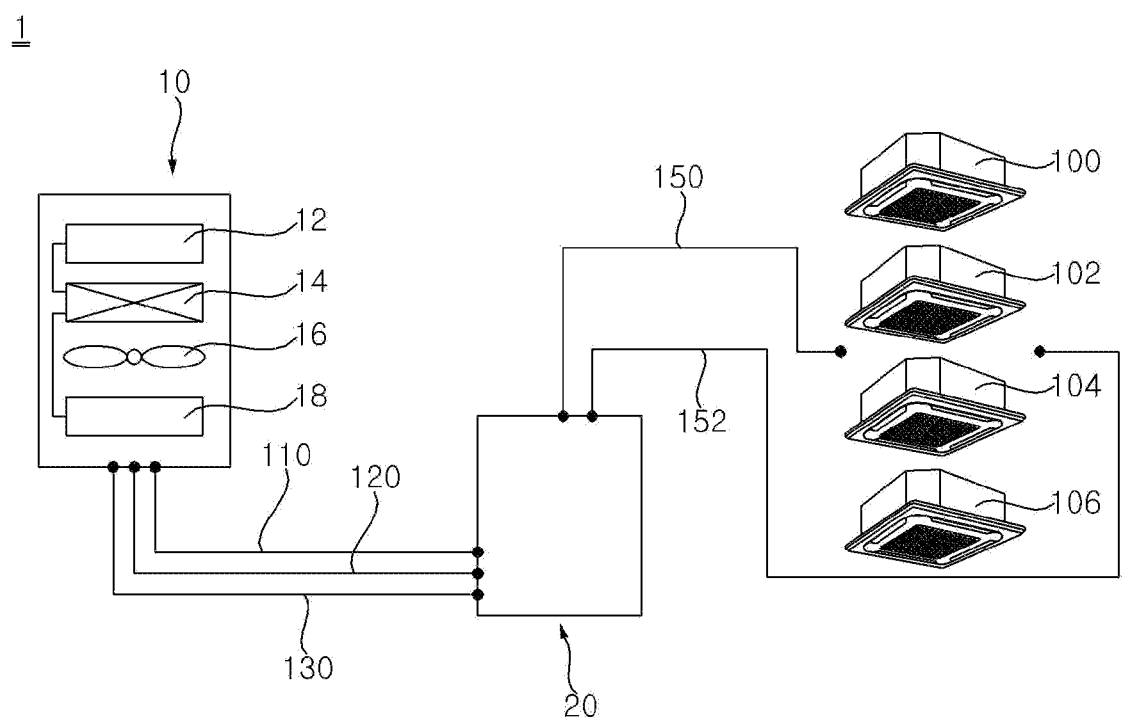
FIG. 1 is a schematic diagram of an air conditioner according to an embodiment of the present disclosure.

Advantages and features of the present disclosure and methods of achieving them will become apparent with reference to the embodiments described below in detail in conjunction with the accompanying drawings. However, the present disclosure is not limited to the embodiments disclosed below, but may be implemented in various different forms, and these embodiments are provided only to allow the disclosure of the present disclosure to be complete, and to completely inform those of ordinary skill in the art to which the present disclosure belongs, the scope of the invention, and the present disclosure is only defined by the scope of the claims. Like reference numerals refer to like elements throughout.

In FIGS. 3 to 8C, indications of up (U), down (D), left (Le), right (Ri), front (F), and rear (R) are for explanation of the disclosure and do not limit the disclosure. In a flow path switching device described in FIGS. 3 to 8C, a first direction (F-R), a second direction (U-D), and a third direction (Ri-Le) are directions perpendicular to each other and are a reference defined for description of the disclosure. It is obvious that this can be applied differently if the viewing direction or reference is different. "Upper" and "lower" used as terms in the description or claims are for describing the disclosure with reference to drawings according to embodiments, and do not limit a position.

Hereinafter, the present disclosure will be described with reference to drawings for explaining an air conditioner including a flow path switching device according to embodiments of the present disclosure.

<Overall Configuration>

Referring to FIG. 1, an air conditioner 1 according to an embodiment of the present disclosure may include an outdoor unit 10, a plurality of indoor units 100, 102, 104, 106 connected to the outdoor unit 10 to adjust the temperature of an indoor space, and a relay device 20 in which a refrigerant circulating in the outdoor unit 10 and water circulating in the plurality of indoor units 100, 102, 104, 106 exchange heat.

The air conditioner 1 may include three refrigerant pipes 110, 120, and 130 connecting the outdoor unit 10 and the relay device 20. That is, the outdoor unit 10 and the relay device 20 may have a "three pipe connection structure". The refrigerant may circulate between the outdoor unit 10 and the relay device 20 through the three refrigerant pipes 110, 120, and 130.

The three refrigerant pipes 110, 120, and 130 may include a high-pressure gas pipe 110 through which high-pressure gaseous refrigerant flows, a low-pressure gas pipe 120 through which low-pressure gaseous refrigerant flows, and a liquid pipe 130 through which liquid refrigerant flows. The high-pressure gas pipe 110 may be connected to the discharge side of the compressor 12 disposed in the outdoor unit 10. The low pressure gas pipe 120 may be connected to a suction side of the compressor 12. The liquid pipe 130 may be connected to the outdoor heat exchanger 14 disposed in the outdoor unit 10.

The air conditioner 1 may include a plurality of water pipes connecting the relay device 20 and each of the plurality of indoor units 100, 102, 104, and 106. Each of the plurality of indoor units 100, 102, 104, and 106 may be connected to a water supply pipe 150 through which water is supplied from the relay device 20 and a water discharge pipe 152 through which water is discharged to the relay device 20. The water pipe includes a water supply pipe 150 and a water discharge pipe 152. The water supply pipe 150 and the water discharge pipe 152 may be provided to correspond to the number of indoor units 100, 102, 104, and 106.

The outdoor unit 10 may include a simultaneous cooling/heating type outdoor unit. The outdoor unit 10 and the relay device 20 may be fluidly connected by a first fluid. The first fluid may include a refrigerant.

The outdoor unit 10 may include a compressor 12 for compressing refrigerant, an outdoor heat exchanger 14 that is disposed inside the outdoor unit and exchanges heat between external air and the refrigerant, and an outdoor fan 16 that is disposed in one side of the outdoor heat exchanger 14 and forms air flow to the outdoor heat exchanger 14. Heat exchange between the refrigerant and the air may be achieved as the outdoor air flows into the outdoor heat exchanger 14 by the driving of the outdoor fan 16.

In addition, the outdoor unit 10 may further include an outdoor expansion valve 18 that expands the refrigerant that is discharged from the outdoor heat exchanger 14 or supplied to the outdoor heat exchanger 14.

The plurality of indoor units 100, 102, 104, and 106 may include a simultaneous heating/cooling type indoor unit. Each of the plurality of indoor units 100, 102, 104, and 106 and the relay device may be fluidly connected by a second fluid. The second fluid may include water.

Each of the plurality of indoor units 100, 102, 104, and 106 may include an indoor heat exchanger (not shown) disposed inside the indoor unit 100, 102, 104, and 106 to exchange heat between indoor air and water, and an indoor fan (not shown) disposed in one side of the indoor heat exchanger (not shown) to form an air flow to the indoor heat exchanger.

<Relay Device>

Figure 2:
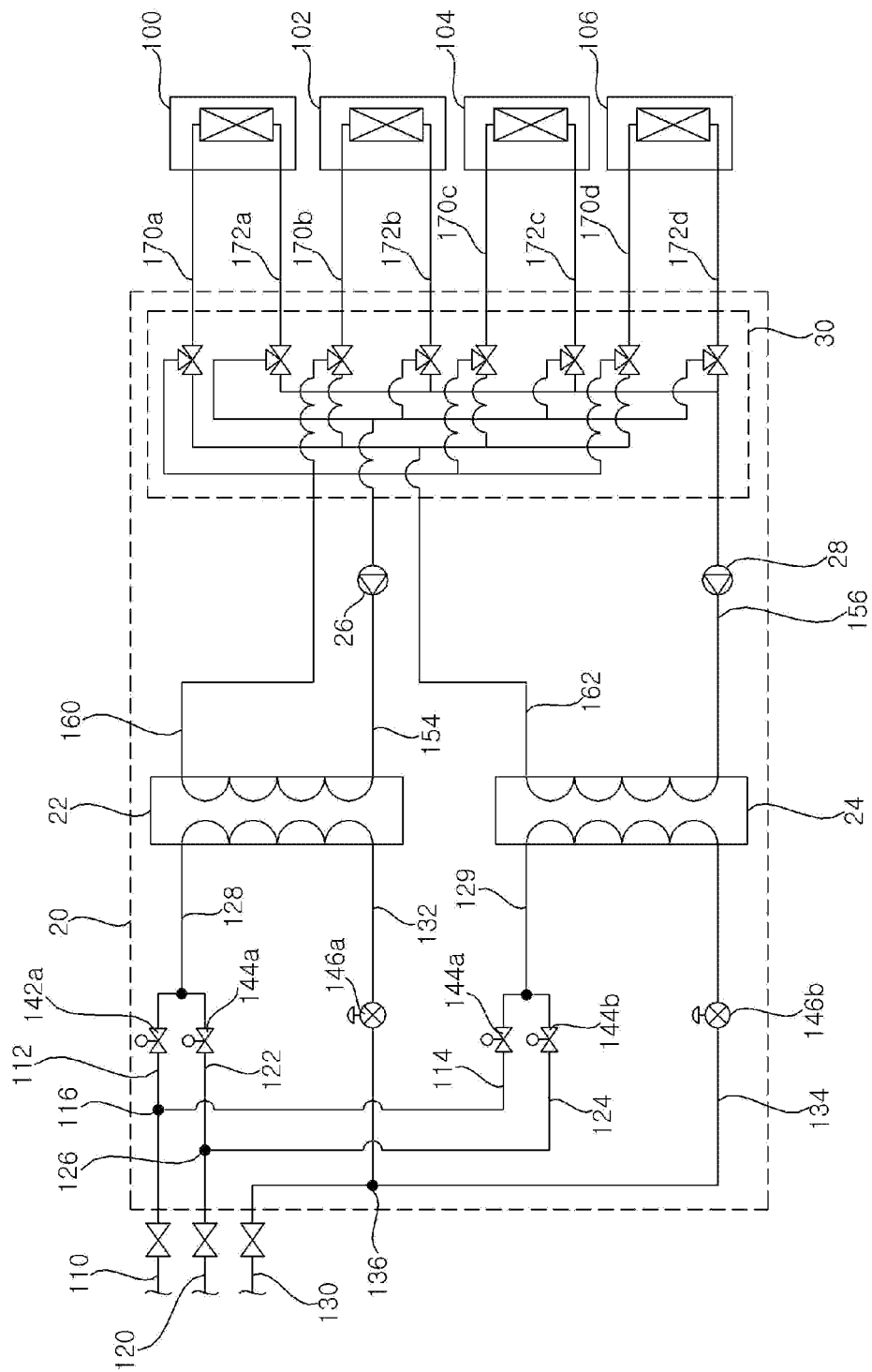
FIG. 2 is a schematic diagram illustrating a connection relationship between a relay device and a plurality of indoor units according to an embodiment of the present disclosure.

Referring to FIG. 2, the relay device 20 includes a heat exchanger 22, 24 for exchanging heat between the refrigerant and water, a pump 26, 28 for forming a flow of water flowing through the water pipe, a plurality of refrigerant valves that are disposed in the refrigerant pipe 110, 120, and 130 disposed inside the relay device 20 and control the flow of the refrigerant, and a flow path switching device 30 that is disposed in a water pipe disposed inside the relay device 20 and controls the flow of water.

Inside the relay device 20, the refrigerant pipe 110, 120, 130 connecting the outdoor unit 10 and the heat exchanger 22, 24, and the water pipe connecting the plurality of indoor units 100, 102, 104 and 106 and the heat exchanger 22, 24 are disposed.

Referring to FIG. 2, the refrigerant pipe 110, 120, 130 may include a high-pressure gas pipe 110 in which a high-pressure gaseous refrigerant flows, a low-pressure gas pipe 120 in which a low-pressure gaseous refrigerant flows, and a liquid pipe 130 through which liquid refrigerant flows.

The high-pressure gas pipe 110 may include a first high-pressure guide pipe 112 connected to a first heat exchanger 22 and a second high-pressure guide pipe 114 connected to a second heat exchanger 24. In the high-pressure gas pipe 110, a high-pressure branch point 116 branching into the first high-pressure guide pipe 112 and the second high-pressure guide pipe 114 may be formed.

The low pressure gas pipe 120 may include a first low pressure guide pipe 122 connected to the first heat exchanger 22 and a second low pressure guide pipe 124 connected to the second heat exchanger 24. In the low-pressure gas pipe 120, a low-pressure branch point 126 branching into the first low-pressure guide pipe 122 and the second low-pressure guide pipe 124 may be formed.

The first low pressure guide pipe 122 and the first high pressure guide pipe 112 may be joined to a first refrigerant pipe 128 and connected to the first heat exchanger 22, and the second low pressure guide pipe 124 and the second high-pressure guide pipe 114 may be joined to a second refrigerant pipe 129 and connected to the second heat exchanger 24.

The liquid pipe 130 includes a first liquid guide pipe 132 connected to the first heat exchanger 22 and a second liquid guide pipe 134 connected to the second heat exchanger 24. A liquid pipe branch point 136 branching into the first liquid guide pipe 132 and the second liquid guide pipe 134 may be formed in the liquid pipe 130.

Referring to FIG. 2, the plurality of refrigerant valves may change the flow direction of the refrigerant by operating the valve. In addition, the plurality of refrigerant valves may adjust the flow rate of the refrigerant by operating the valve.

The plurality of refrigerant valves may include a high-pressure valve 142a and 142b that is disposed in each of the first high-pressure guide pipe 112 and the second high-pressure guide pipe 114 to open and close the first high-pressure guide pipe 112 and the second high-pressure guide pipe 114, a low-pressure valve 144a and 144b that is disposed in each of the first low-pressure guide pipe 122 and the second low-pressure guide pipe 124 to open and close the first low-pressure guide pipe 122 and the second low-pressure guide pipe 124, and a liquid pipe valve 146a and 146b that is disposed in the first liquid guide pipe 132 and the second liquid guide pipe 134 to adjust the flow rate of the refrigerant flowing through the refrigerant pipe 110, 120, 130.

Referring to FIG. 2, the water pipe may include an inflow pipe 154, 156 for guiding water to flow into the heat exchanger 22, 24 and a discharge pipe 160, 162 for guiding water discharged from the heat exchangers 22, 24.

The inflow pipe 154, 156 may guide water passing through the indoor unit 100, 102, 104, 106 to flow into the heat exchanger 22, 24. The discharge pipe 160, 162 may guide water passing through the heat exchanger 22, 24 to flow to the indoor unit 100, 102, 104, 106.

The inflow pipe 154, 156 may include a first inflow pipe 154 for guiding water to the first heat exchanger 22 and a second inflow pipe 156 for guiding water to the second heat exchanger 24. The discharge pipe 160, 162 may include a first discharge pipe 160 for guiding water passing through the first heat exchanger 22 to the indoor unit 100, 102, 104, 106 and a second discharge pipe 162 for guiding water passing through the second heat exchanger 24 to the indoor unit 100, 102, 104, 106.

The first inflow pipe 154 may extend to the water inlet of the first heat exchanger 22. The first discharge pipe 160 may extend from the water outlet of the first heat exchanger 22. Likewise, the second inflow pipe 156 may extend to the water inlet of the second heat exchanger 24. The second discharge pipe 162 may extend from the water outlet of the second heat exchanger 24.

Each of the inflow pipe 154, 156 and the discharge pipe 160, 162 may extend to the flow path switching device 30. The water flowed to the water inlet of the heat exchanger 22, 24 from the inflow pipe 154, 156 may exchange heat with the refrigerant, and then flow to the water discharge pipe 160, 162 through the water outlet of the heat exchanger 22, 24.

The water pipe may include a plurality of indoor inflow pipes 170a, 170b, 170c, 170d guiding water to flow into each of the plurality of indoor units 100, 102, 104, 106, and a plurality of indoor discharge pipes 172a, 172b, 172c, 172d guiding water discharged from each of the plurality of indoor units 100, 102, 104, 106.

Each of the plurality of indoor inflow pipes 170a, 170b, 170c, and 170d and the plurality of indoor discharge pipes 172a, 172b, 172c, and 172d is connected to the flow path switching device 30.

The indoor inflow pipe 170a, 170b, 170c, 170d may include a first indoor inflow pipe 170a coupled to the inlet of a first indoor unit 100, a second indoor inflow pipe 170b coupled to the inlet of a second indoor unit 102, a third indoor inflow pipe 170c coupled to the inlet of a third indoor unit 104, and a fourth indoor inflow pipe 170d coupled to the inlet of a fourth indoor unit 106. Each of the first indoor inflow pipe 170a, the second indoor inflow pipe 170b, the third indoor inflow pipe, and the fourth indoor inflow pipe 170d is connected to the flow path switching device 30.

The indoor discharge pipe 172a, 172b, 172c, and 172d may include a first indoor discharge pipe 172a coupled to the outlet of the first indoor unit 100, a second indoor discharge pipe 172b coupled to the outlet of the second indoor unit 102, a third indoor discharge pipe 172c coupled to the outlet of the third indoor unit 104, and a fourth indoor discharge pipe 172d coupled to the outlet of the fourth indoor unit 106. Each of the first indoor discharge pipe 172a, the second indoor discharge pipe 172b, the third indoor discharge pipe, and the fourth indoor discharge pipe 172d is connected to the flow path switching device 30.

Referring to FIG. 2, the heat exchanger 22, 24 may be provided so that the refrigerant flow path and the water flow path exchange heat with each other. The heat exchanger 22, 24 may include a plate type heat exchanger capable of exchanging heat between water and the refrigerant. The heat exchanger 22, 24 may be configured such that a flow path through which refrigerant flows and a flow path through which water flows are alternately stacked.

A plurality of heat exchangers 22, 24 may be provided to simultaneously provide cooling and heating to each of the plurality of indoor units 100, 102, 104, and 106. Referring to FIG. 2, the heat exchanger 22, 24 may include a first heat exchanger 22 and a second heat exchanger 24. The first heat exchanger 22 may heat water by exchanging heat with the refrigerant, and the second heat exchanger 24 may cool the water by exchanging heat with the refrigerant.

However, this is just one embodiment, and a structure in which the first heat exchanger 22 cools water and the second heat exchanger 24 heats water, or a structure in which the first heat exchanger 22 and the second heat exchanger 24 alternately cool or heat water may be possible.

Water flowing through the water pipe is selectively flowed into the first heat exchanger 22 or the second heat exchanger 24 according to the operation mode of the indoor unit 100, 102, 104, and 106 to exchange heat with the refrigerant.

Referring to FIG. 2, the pump 26, 28 may provide pressure so that water in inflow pipe 154, 156 is directed to heat exchanger 22, 24. The pump 26, 28 may be installed in the water pipe to set the flow direction of the second fluid.

The pump 26, 28 may include a first pump 26 installed in the first inflow pipe 154 and a second pump 28 installed in the second inflow pipe 156.

The pump 26, 28 may force the flow of water. When the first pump 26 is operated, the water passing through the first heat exchanger 22 may flow to the plurality of indoor units 100, 102, 104, and 106 via the flow path switching device 30. Similarly, when the second pump 28 is operated, the water passing through the second heat exchanger 24 may flow to the plurality of indoor units 100, 102, 104, and 106 via the flow path switching device 30.

<Flow Path Switching Device>

Hereinafter, referring to FIGS. 2 to 8C, the flow path switching device 30 will be described.

Referring to FIG. 2, the flow path switching device 30 sends water flowing through the first heat exchanger 22 or the second heat exchanger 24 to each of the plurality of indoor units 100, 102, 104, 106, and sends water flowing through each of the plurality of indoor units 100, 102, 104, and 106 to the first heat exchanger 22 or the second heat exchanger 24.

The flow path switching device 30 is connected to the first heat exchanger 22 and the second heat exchanger 24 through the inflow pipe 154, 156 and the discharge pipe 160, 162. The flow path switching device 30 is connected to each of a plurality of indoor units 100, 102, 104, and 106 through a plurality of indoor inflow pipes 170a, 170b, 170c, and 170d and a plurality of indoor discharge pipes 172a, 172b, 172c, and 172d.

Referring to FIGS. 3 to 6, the flow path switching device 30 includes a case 32 including a first nozzle 34 into which fluid flows from the indoor unit 100, 102, 104, 106, a second nozzle 40 which sends the fluid to the indoor unit 100, 102, 104, 106, a plurality of inner inflow pipes 62 and 66 through which the fluid heat-exchanged from the heat exchanger 22, 24 flows, a plurality of inner outflow pipes 52, 56 for sending the fluid supplied from the first nozzle 34 to the heat exchanger 22, 24, and a flow path connection portion 70 in which a space is formed to communicate the plurality of inner outflow pipes 52 and 56 with the first nozzle 34 or to communicate the plurality of inner inflow pipes 62 and 66 with the second nozzle 40; a valve 80 that is rotatably disposed in the space 72, 74 of the flow path connection portion 70, connects one pipe among the plurality of inner outflow pipes 52 and 56 to the first nozzle 34 according to the disposition, and connects one of the plurality of inner inflow pipes 62 and 66 to the second nozzle 40; and a motor 99 disposed in one side of the valve 80 to rotate the valve 80.

Figure 3:
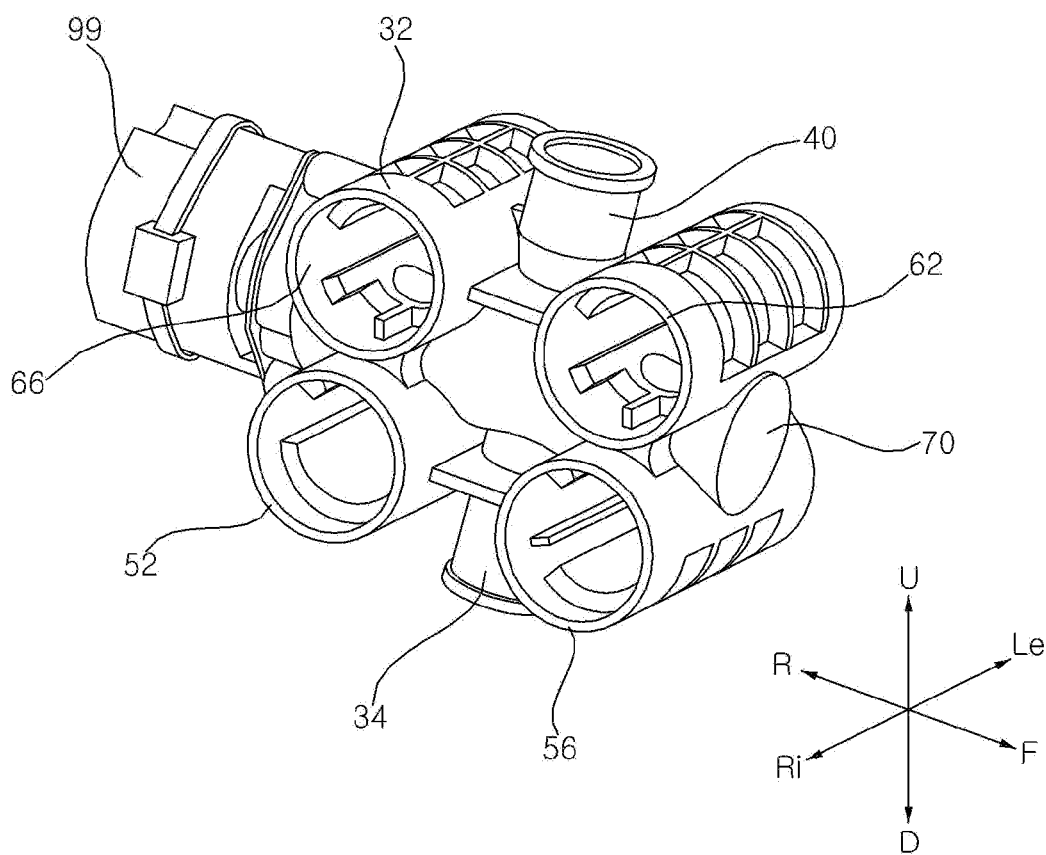
FIG. 3 is a perspective view of a flow path switching device according to an embodiment of the present disclosure.
Figure 6:
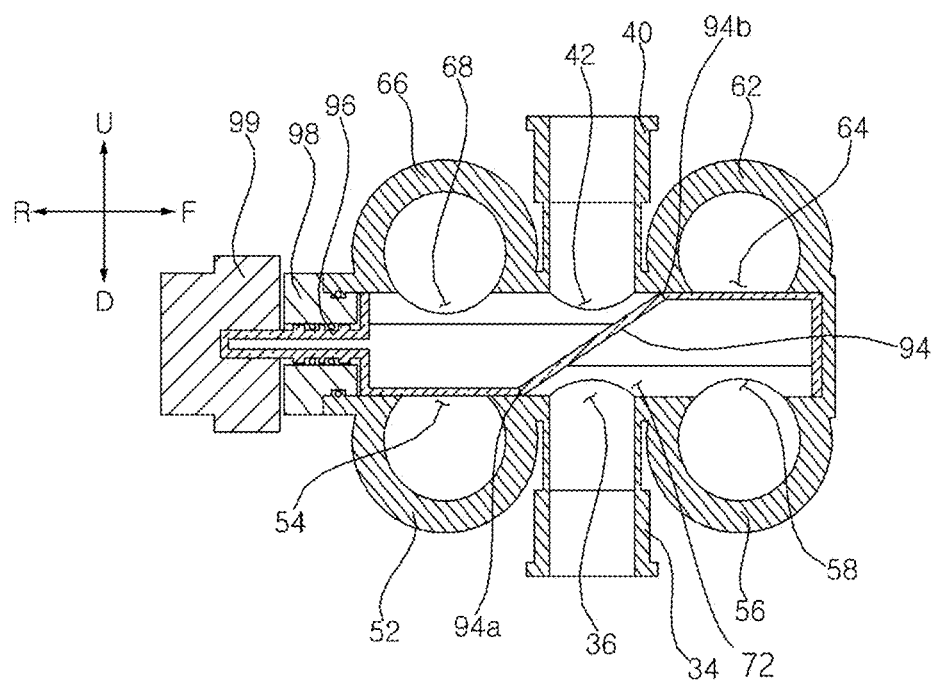
FIG. 6 is a cross-sectional view for explaining an internal configuration of a flow path switching device according to an embodiment of the present disclosure.

Referring to FIG. 3, the case 32 includes a plurality of inner outflow pipes 52 and 56 and a plurality of inner inflow pipes 62 and 66. Referring to FIG. 6, each of the plurality of inner outflow pipes 52 and 56 is disposed parallel to a rotation shaft 96 on which the valve 80 rotates. In addition, each of the plurality of inner inflow pipes 62 and 66 is disposed parallel to the rotation shaft 96 on which the valve 80 rotates. The plurality of inner inflow pipes 52 and 56 are disposed in opposite directions to the plurality of inner inflow pipes 62 and 66 based on the rotation shaft 96 on which the valve 80 rotates.

Referring to FIG. 6, the plurality of inner outflow pipes 52 and 56 include a first inner outflow pipe 52 connected to the first heat exchanger 22 and a second inner outflow pipe 52 connected to the second heat exchanger 24. The plurality of inner inflow pipes 62 and 66 include a first inner inflow pipe 62 connected to the first heat exchanger 22 and a second inner inflow pipe 66 connected to the second heat exchanger 24.

In each of the first inner outflow pipe 52 and the second inner outflow pipe 56, a first outflow hole 54 and a second outflow hole 58 that communicate with a space 72 of the flow path connection portion 70 are formed. Each of the first outflow hole 54 and the second outflow hole 58 is opened in a direction perpendicular to a pipe direction of each of the first inner outflow pipe 52 and the second inner outflow pipe 56.

In each of the first inner inflow pipe 62 and the second inner inflow pipe 66, a first inflow hole 64 and a second inflow hole 68 that communicate with the space 72 of the flow path connection portion 70 are formed. Each of the first inflow hole 64 and the second inflow hole 68 is opened in a direction perpendicular to the pipe direction of each of the first inner inflow pipe 62 and the second inner inflow pipe 66.

The first inner outflow pipe 52 may be connected to the first heat exchanger 22 so that water heated in the first heat exchanger 22 may flow. The second inner outflow pipe 56 may be connected to the second heat exchanger 24 so that water cooled in the second heat exchanger 24 may flow.

The first inner outflow pipe 52 and the second inner outflow pipe 56 are spaced apart from each other, and the first inner inflow pipe 62 and the second inner inflow pipe 66 are spaced apart from each other.

Referring to FIG. 6, the first inner outflow pipe 52 and the second inner outflow pipe 56 are disposed in the opposite direction to the first inner inflow pipe 62 and the second inner inflow pipe 66 based on the rotation shaft 96 around which the valve 80 rotates. Meanwhile, the first inner outflow pipe 52 and the second inner outflow pipe 56 are disposed in parallel with the rotation shaft 96 around which the valve 80 rotates, and the first inner inflow pipe 62 and the second inner inflow pipe 62 are also disposed in parallel with the rotation shaft 96 around which the valve 80 rotates.

Referring to FIG. 6, each of the first inflow hole 64, the second inflow hole 68, the first outflow hole 54, and the second outflow hole 58 is opened in a second direction U-D perpendicular to the first direction F-R. The first inflow hole 64 and the second outflow hole 58 are disposed to face each other, and the second inflow hole 68 and the first outflow hole 54 are disposed to face each other.

The case 32 includes a first nozzle 34 that receives a fluid discharged from the indoor unit 100, 102, 104, 106, and sends it to the first inner outflow pipe 52 or the second inner outflow pipe 56, and a second nozzle 40 that sends the fluid supplied from the first inner inflow pipe 62 or the second inner inflow pipe 66 to the indoor unit 100, 102, 104, 106.

The first nozzle 34 may be connected to the indoor discharge pipe 172a, 172b, 172c, 172d so that water discharged from the indoor unit 100, 102, 104, 106 may be supplied. The first nozzle 34 may be connected to the first inner outflow pipe 52 or the second inner outflow pipe 56 so that the water discharged from the indoor unit 100, 102, 104, 106 is sent to the first heat exchanger 22 or the second heat exchanger.

Referring to FIG. 6, the first nozzle 34 is disposed between the first inner outflow pipe 52 and the second inner outflow pipe 56. The first nozzle 34 extends in the second direction U-D perpendicular to a third direction Ri-Le in which the first inner outflow pipe 52 and the second inner outflow pipe 56 extend. The first nozzle 34 extends in the second direction U-D perpendicular to the first direction F-R in which the rotation shaft 96 of the valve 80 is formed.

In the first nozzle 34, a first nozzle hole 36 communicating with the space 72 of the flow path connection portion 70 is formed.

The second nozzle 40 may send water supplied to the first inner inflow pipe 62 or the second inner inflow pipe 66 to the indoor unit 100, 102, 104, 106. The second nozzle 40 may be connected to the indoor inflow pipe 170a, 170b, 170c, 170d, and supply the water supplied from the first heat exchanger 22 or the second heat exchanger 24 to the indoor unit 100, 102, 104, 106.

The second nozzle 40 is disposed between the first inner inflow pipe 62 and the second inner inflow pipe 66. The second nozzle 40 extends in the second direction U-D perpendicular to the third direction Ri-Le in which the first inner inflow pipe 62 and the second inner inflow pipe 66 extend. The second nozzle 40 extends in the second direction U-D perpendicular to the first direction F-R in which the rotation shaft 96 of the valve 80 is formed.

In the second nozzle 40, a second nozzle hole 42 communicating with the space 72 of the flow path connection portion 70 is formed.

The flow path connection portion 70 may connect the first nozzle 34 and the first inner outflow pipe 52 or the second inner outflow pipe 56, or form the space 72 connecting the second nozzle 40 and the first inner inflow pipe 62 or the second inner inflow pipe 66.

The space 72 in which the valve 80 is rotatably disposed is formed inside the flow path connection portion 70. Based on the space 72, the first outflow hole 54 and the second outflow hole 58 are formed in a lower side and the first inflow hole 64 and the second inflow hole 68 are formed in an upper side.

Figure 4:
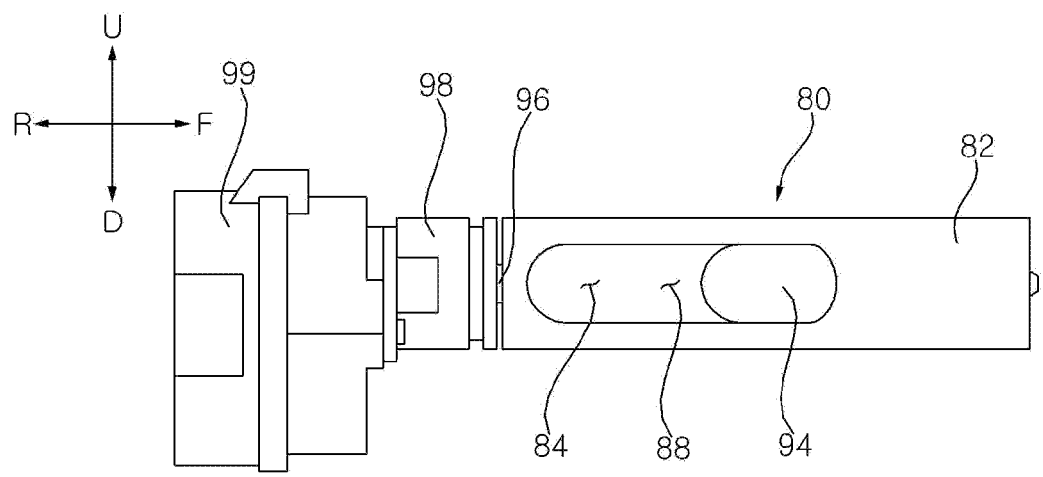
FIG. 4 is a plan view of a valve and a motor according to an embodiment of the present disclosure.
Figure 5:
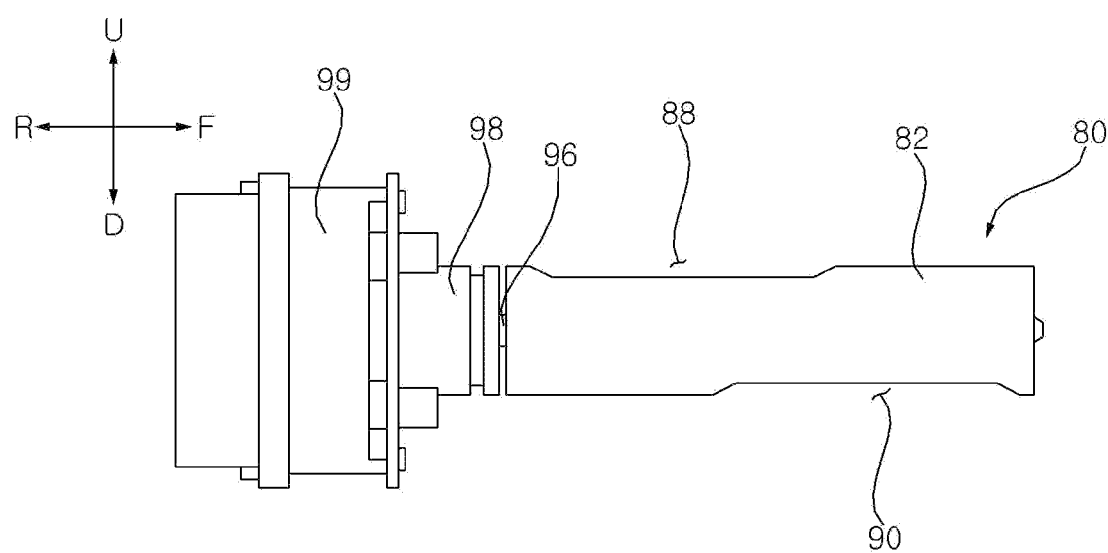
FIG. 5 is a side view of FIG. 4.

Referring to FIGS. 4 to 6, the valve 80 includes a valve body 82 that forms an outer shape, and forms a first chamber 84 which connects the inner outflow pipe 52 disposed close to the motor 99 and the first nozzle 34, or connects the inner inflow pipe 66 disposed close to the motor 99 and the second nozzle 40, and a second chamber 86 which connects the inner outflow pipe 56 disposed far from the motor 99 and the first nozzle 34, or connects the inner inflow pipe 62 disposed far from the motor 99 and the second nozzle 40 therein, and a guide plate 94 that is disposed inside the valve body 82 and partitions the first chamber 84 and the second chamber 86.

The guide plate 94 is disposed between the first nozzle 34 and the second nozzle 40, and forms an inclined surface in the direction in which the first nozzle 34 and the second nozzle 40 extend.

Referring to FIG. 5, the valve body 82 has a cylindrical shape, and has the first chamber 84 and the second chamber 86 formed therein. Inside the valve body 82, a guide plate 94 partitioning the first chamber 84 and the second chamber 86 is disposed.

In the valve body 82, a first chamber hole 88 connecting the inner outflow pipe 52 disposed close to the motor 99 or the inner inflow pipe 66 to the first nozzle 34 or the second nozzle 40 is formed. According to disposition, the first chamber hole 88 may communicate the first nozzle hole 36 and the first outflow hole 54 or communicate the second nozzle hole 42 and the second inflow hole 68.

The first chamber hole 88 is formed from a position communicating with the first inner outflow pipe 52 disposed close to the motor 99 or the second inner inflow pipe 66 to a position communicating with the first nozzle 34 or the second nozzle 40.

According to disposition of the valve 80, the first chamber 84 may connect the first nozzle 34 and the first inner outflow pipe 52, or connect the second nozzle 40 and the second inner inflow pipe 66.

In the valve body 82, a second chamber hole 90 connecting the inner outflow pipe 56 disposed far from the motor 99 or the inner inflow pipe 62 to the first nozzle 34 or the second nozzle 40 is formed. According to disposition, the first chamber hole 88 may communicate the first nozzle hole 36 and the second outflow hole 58 or communicate the second nozzle hole 42 and the first inflow hole 64.

The first chamber hole 88 is formed from a position communicating with the first inner outflow pipe 52 disposed far from the motor 99 or the first inner inflow pipe 62 to a position communicating the first nozzle 34 or the second nozzle 40.

According to disposition of the valve 80, the first chamber 84 may connect the first nozzle 34 and the first inner outflow pipe 52 or connect the second nozzle 40 and the first inner inflow pipe 62.

Referring to FIG. 5, the first chamber hole 88 and the second chamber hole 90 may be formed to have the same size. The first chamber hole 88 and the second chamber hole 90 are opened in different directions. Accordingly, when the first chamber hole 88 is disposed to face the first nozzle hole 36, the second chamber hole 90 may be disposed to face the second nozzle hole 42.

The guide plate 94 is disposed between the first chamber 84 and the second chamber 86. The guide plate 94 is disposed between the first nozzle 34 and the second nozzle 40. The guide plate 94 is disposed obliquely in the direction of the water supplied to the first nozzle 34, so that water flowing from the first nozzle 34 may be sent to the first inner outflow pipe 52 or the second inner outflow pipe 56. The guide plate 94 is disposed obliquely in the direction of the water supplied to the second nozzle 40, so that water flowing from the first inner inflow pipe 62 or the second inner inflow pipe 66 may be sent to the second nozzle 40.

Referring to FIG. 6, in the guide plate 94, one end 94a may be disposed between the first nozzle 34 and the first inner outflow pipe 52, or disposed between the second nozzle 40 and the second inner inflow pipe 66. In the guide plate 94, the other end 94b may be disposed between the first nozzle 34 and the first inner outflow pipe 52, or disposed between the second nozzle 40 and the first inner inflow pipe 62.

In the valve body 82, a second chamber hole 90 is formed in a direction in which the first nozzle 34 or the second nozzle 40 is disposed based on one end 94a of the guide plate 94, and a first chamber hole 88 is formed in a direction in which the first nozzle 34 or the second nozzle 40 is disposed based on the other end 94b of the guide plate 94.

The valve 80 further includes the rotation shaft 96 that extends from a distal end of the valve body 82 in a direction in which the motor 99 is disposed, is connected to the motor 99, and rotates the valve body 82.

The motor 99 is disposed in one side of the valve 80, is connected to the valve 80 by the rotation shaft 96, and can rotate the valve 80.

Referring to FIG. 6, the flow path switching device 30 may further include a valve fixing member 98 for fixing the disposition of the rotating valve 80 inside the flow path connection portion 70 of the case 32. The valve fixing member 98 may prevent movement of the valve 80 rotating inside the flow path connection portion 70. The valve fixing member 98 may be disposed around the rotation shaft 96 of the valve 80. The valve fixing member 98 may be disposed between the rotation shaft 96 of the valve 80 and the case 32.

Figure 7:
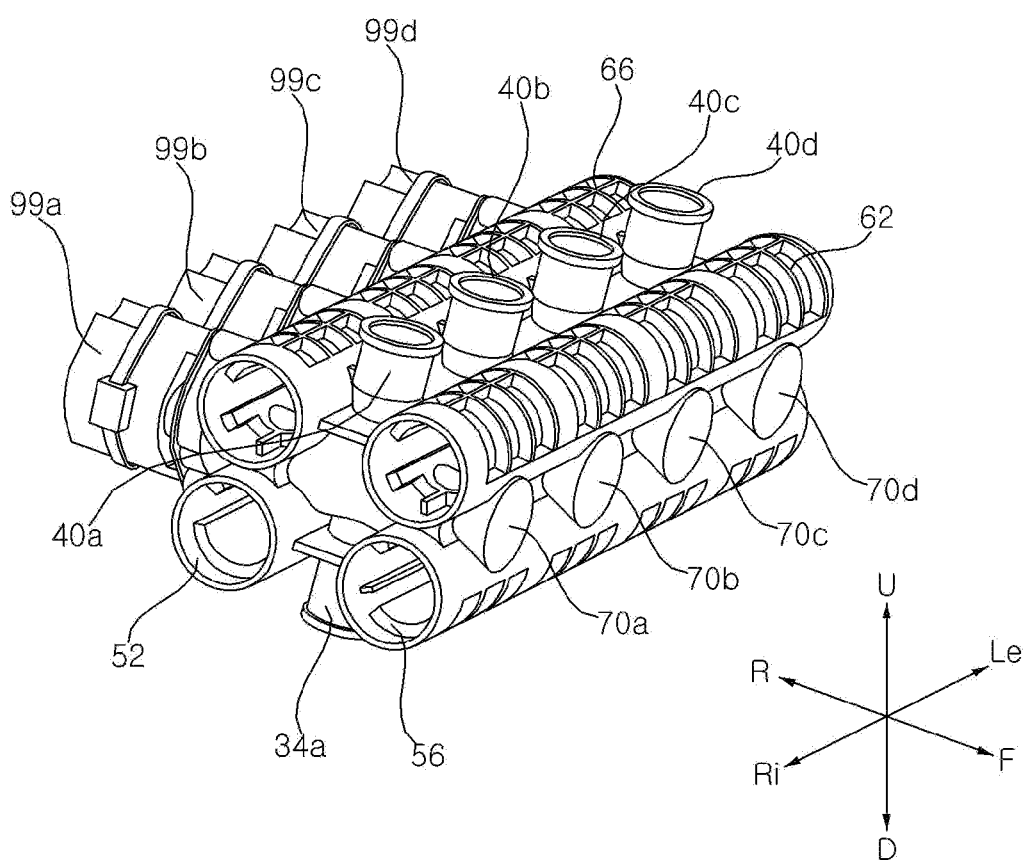
FIG. 7 is a perspective view of a flow path switching device in which a plurality of flow path connection portions, a valve, and a motor are disposed.

Referring to FIG. 7, the case 32 includes a plurality of flow path connection portions 70*a*, 70*b*, 70*c*, and 70*d*. In each of the plurality of flow path connection portions 70*a*, 70*b*, 70*c*, and 70*d*, a first nozzle 34*a*, 34*b*, 34*c*, 34*d* through which water flowed from the indoor unit 100, 102, 104, 106 flows, and a second nozzle 40*a*, 40*b*, 40*c*, 40*d* through which water supplied to the indoor unit 100, 102, 104, 106 flows are disposed.

Referring to FIG. 7, the flow path switching device 30 includes a plurality of valves 80*a*, 80*b*, 80*c*, and 80*d* disposed inside each of the plurality of flow path connection portions 70*a*, 70*b*, 70*c*, and 70*d*, and a plurality of motors 99*a*, 99*b*, 99*c*, 99*d* connected to each of a plurality of valves 80*a*, 80*b*, 80*c*, 80*d*.

Each of the plurality of flow path connection portions 70*a*, 70*b*, 70*c*, and 70*d* is connected to each of the plurality of indoor units 100, 102, 104, and 106. Referring to FIG. 7, the plurality of flow path connection portions 70*a*, 70*b*, 70*c*, and 70*d* may be spaced apart from each other in a direction in which the plurality of inner inflow pipes 62 and 66 and the plurality of inner outflow pipes 52 and 56 are extended. The plurality of flow path connection portions 70*a*, 70*b*, 70*c*, and 70*d* may be spaced apart from each other in the third direction Ri-Le perpendicular to the first direction F-R.

<Operation>

Hereinafter, the flow of fluid according to the operation of the flow path switching device 30 will be described with reference to FIGS. 8A to 8C.

A plurality of valves are disposed in the case 32, and each of the plurality of valves is connected to each of a plurality of indoor units. The plurality of indoor units may be operated in a cooling or heating mode according to conditions of an indoor space or a user's determination. Accordingly, each of the plurality of valves may be operated in different directions.

Figure 8A:
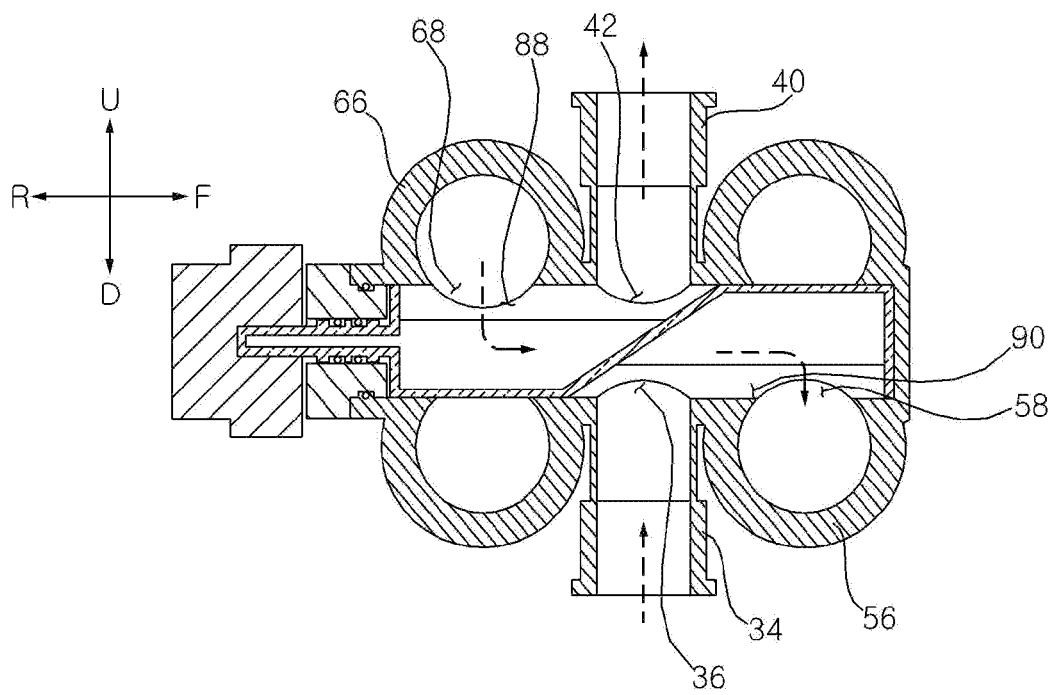
FIGS. 8A to 8C are views for explaining the flow of water flowing through a flow path switching device according to an embodiment of the present disclosure.

Referring to FIG. 8A, the valve 80 may connect the first nozzle 34 and the first inner outflow pipe 52, and connect the second nozzle 40 and the first inner inflow pipe 62, so that one indoor unit and the first heat exchanger 22 may be connected. At this time, when the first heat exchanger 22 supplies water heated through a refrigerant, the heated water can be supplied to the indoor unit 100, 102, 104, 106.

Figure 8B:
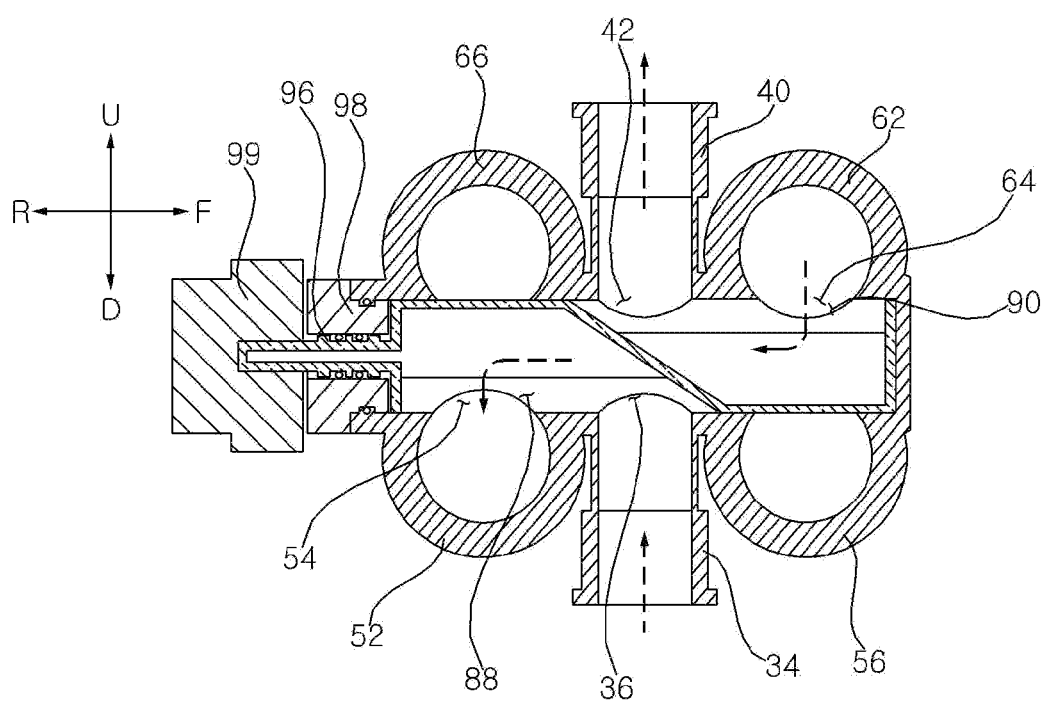

Referring to FIG. 8B, the valve 80 may connect the first nozzle 34 and the second inner outflow pipe 56, and connect the second nozzle 40 and the second inner inflow pipe 66, so that one indoor unit and the second heat exchanger 24 may be connected. At this time, when the second heat exchanger 24 supplies water cooled through a refrigerant, the cooled water may be supplied to the indoor unit 100, 102, 104, 106.

Figure 8C:
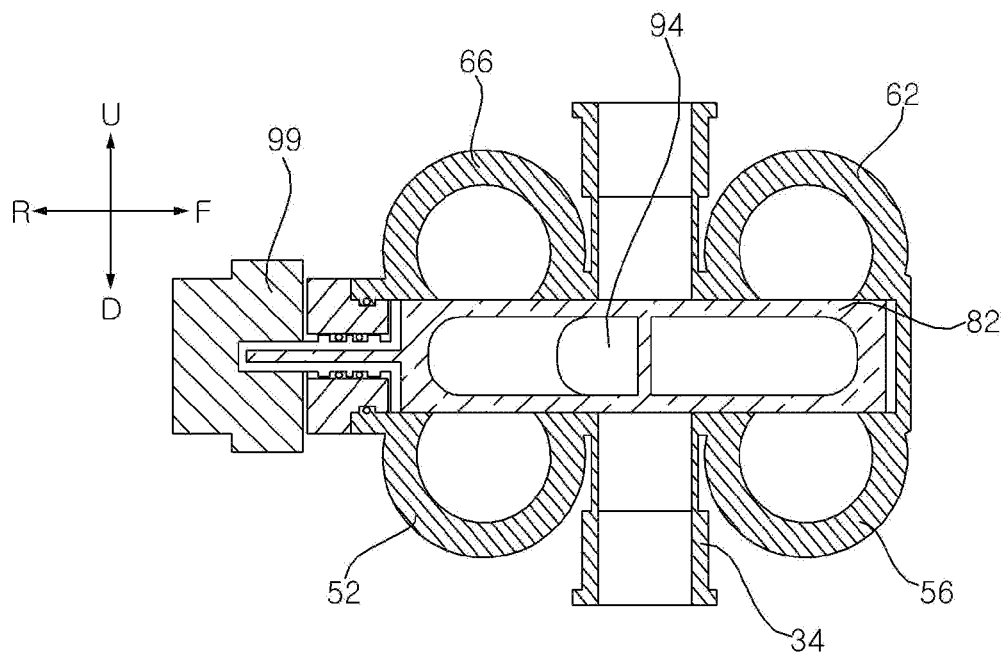

Referring to FIG. 8C, the valve 80 may close the first nozzle 34 and the second nozzle 40. When a corresponding indoor unit is not separately operated, the inside of the flow path connection portion is closed through the valve 80 to prevent heat-exchanged water from flowing into an indoor unit that does not require heat exchange.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

The invention claimed is:

1. A flow path switching device, comprising:
a case comprising a first nozzle into which fluid flows from an indoor unit, a second nozzle which sends fluid to the indoor unit, a pair of inner outflow pipes through which fluid supplied from the first nozzle flows, a pair of inner inflow pipes through which fluid supplied to the second nozzle flows, and a flow path connection portion in which a space is formed to connect the pair of inner outflow pipes with the first nozzle or to connect the pair of inner inflow pipes with the second nozzle;
a valve which is rotatably disposed in the space, connects one of the pair of inner outflow pipes and the first nozzle, and connects one of the pair of inner inflow pipes and the second nozzle; and
a motor which is disposed in one side of the valve, and rotates the valve, wherein the pair of inner outflow pipes is arranged in parallel with the pair of inner inflow pipes, wherein the pair of inner outflow pipes is disposed in an opposite direction to the pair of inner inflow pipes based on a rotary shaft of the valve, wherein the first nozzle is disposed between the pair of inner outflow pipes so as to extend in a direction perpendicular to the pair of inner outflow pipes, wherein the second nozzle is disposed between the pair of inner inflow pipes so as to extend in a direction perpendicular to the pair of inner inflow pipes, wherein the rotary shaft of the valve is disposed perpendicular to the direction in which the pair of inner inflow pipes and the pair of inner outflow pipes extend, and perpendicular to the direction in which the first nozzle and the second nozzle extend, and wherein the first nozzle and the second nozzle extend in opposite directions with respect to the flow path connection portion.

2. The flow path switching device of claim 1, wherein the valve comprises a guide plate which forms an inclined surface between the first nozzle and the second nozzle, and according to disposition, sends fluid flowing from the first nozzle to one of the pair of inner outflow pipes, and sends fluid flowing from one of the pair of inner inflow pipes to the second nozzle.

3. The flow path switching device of claim 1, wherein a first nozzle hole through which the first nozzle communicates with the space is formed in the same direction as a pair of outflow holes through which each of the pair of inner outflow pipes communicates with the space, and a second nozzle hole through which the second nozzle communicates with the space is formed in the same direction as a pair of inflow holes through which each of the pair of inner inflow pipes communicates with the space.

4. The flow path switching device of claim 1, wherein the pair of inner inflow pipes comprises:
a first inner inflow pipe through which fluid heat-exchanged with refrigerant flows through a first heat exchanger, and a second inner inflow pipe through which fluid heat-exchanged with refrigerant flows through a second heat exchanger, wherein the pair of inner outflow pipes comprises:
a first inner outflow pipe for sending fluid to the first heat exchanger and a second inner outflow pipe for sending fluid to the second heat exchanger, wherein the first inner inflow pipe is disposed in an opposite direction to the second inner outflow pipe based on the rotary shaft of the valve, and wherein the second inner inflow pipe is disposed in an opposite direction to the first inner outflow pipe based on the rotary shaft of the valve.

5. The flow path switching device of claim 4, wherein the first nozzle is disposed between the first inner outflow pipe and the second inner outflow pipe, and wherein the second nozzle is disposed between the first inner inflow pipe and the second inner inflow pipe.

6. The flow path switching device of claim 4, wherein in each of the first inner inflow pipe and the second inner inflow pipe, a first inflow hole and a second inflow hole which communicate with the space of the flow path connection portion and are open in a direction perpendicular to the rotary shaft of the valve are formed, and in each of the first inner outflow pipe and the second inner outflow pipe, a first outflow hole and a second outflow hole which communicate with the space of the flow path connection portion and are open in a direction perpendicular to the rotary shaft of the valve are formed.

7. The flow path switching device of claim 6, wherein the first inflow hole and the second outflow hole are disposed to face each other, and wherein the second inflow hole and the first outflow hole are disposed to face each other.

8. The flow path switching device of claim 4, wherein the valve comprises a guide plate which forms an inclined surface between the first nozzle and the second nozzle, wherein when a first end of the guide plate is disposed between the first nozzle and the first inner outflow pipe, a second end of the guide plate is disposed between the second nozzle and the first inner inflow pipe, and when the first end of the guide plate is disposed between the second nozzle and the second inner inflow pipe, the second end of the guide plate is disposed between the first nozzle and the first inner outflow pipe.

9. The flow path switching device of claim 1, wherein the valve comprises:

a valve body which forms an outer shape, and forms, therein, a first chamber that connects an inner outflow pipe of the pair of inner outflow pipes disposed close to the motor and the first nozzle or connects an inner inflow pipe of the pair of inner inflow pipes disposed close to the motor and the second nozzle, and a second chamber that connects an inner outflow pipe of the pair of inner outflow pipes disposed far from the motor and the first nozzle or connects an inner inflow pipe of the pair of inner inflow pipes disposed far from the motor and the second nozzle; and a guide plate which is disposed inside of the valve body, and partitions the first chamber and the second chamber.

10. The flow path switching device of claim 9, wherein in the valve body, a first chamber hole which connects the inner outflow pipe or the inner inflow pipe that is disposed close to the motor with the first nozzle or the second nozzle, and a second chamber hole which connects the inner outflow pipe or the inner inflow pipe that is disposed far from the motor with the first nozzle or the second nozzle are formed.

11. The flow path switching device of claim 10, wherein the first chamber hole and the second chamber hole are formed to have a same size and open in different directions, and when the first chamber hole faces the first nozzle, the second chamber hole is disposed to face the second nozzle.

12. The flow path switching device of claim 10, wherein the first chamber hole and the second chamber hole are formed to overlap in a portion where the first nozzle and the second nozzle are disposed.

13. The flow path switching device of claim 10, wherein the guide plate is disposed inside of the valve body, and connects one end of the first chamber hole and one end of the second chamber hole.

* * * * *